US008014838B2

(12) United States Patent
Takasaki et al.

(10) Patent No.: US 8,014,838 B2
(45) Date of Patent: Sep. 6, 2011

(54) ELECTRONIC APPARATUS FORMED BY NO LESS THAN TWO SECTIONS

(75) Inventors: Hisashi Takasaki, Tokyo (JP); Yosui Tokuyama, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 917 days.

(21) Appl. No.: 11/803,131

(22) Filed: May 11, 2007

(65) Prior Publication Data

US 2007/0263343 A1 Nov. 15, 2007

(30) Foreign Application Priority Data

May 12, 2006 (JP) ................................. 2006-134547

(51) Int. Cl.
 *H04M 1/00* (2006.01)
(52) U.S. Cl. ........... 455/575.3; 379/433.05; 379/433.13; 379/440; 379/433.04; 455/550.1; 455/90.1; 455/566
(58) Field of Classification Search ............. 379/433.05, 379/433.13, 440, 433.04; 455/550.1, 90.1, 455/566
See application file for complete search history.

(56) References Cited

U.S. PATENT DOCUMENTS

| 5,956,398 | A  | * | 9/1999 | Weadon et al. | .......... 379/433.05 |
| 6,345,097 | B1 | * | 2/2002 | Chintala et al. | .......... 379/433.13 |
| 6,785,562 | B2 | * | 8/2004 | Lee et al. | ....................... 455/566 |
| 7,414,855 | B1 | * | 8/2008 | Arnold | .......................... 361/752 |
| 2002/0198016 | A1 | * | 12/2002 | Gupte | ............................ 455/550 |
| 2004/0174137 | A1 | * | 9/2004 | Kim et al. | ...................... 320/114 |
| 2004/0179330 | A1 | * | 9/2004 | Lee et al. | ...................... 361/679 |

FOREIGN PATENT DOCUMENTS

| JP | 2004-128814 A | 4/2004 |
| JP | 2005-354456 A | 12/2005 |
| JP | 2007-113686 A | 5/2007 |

* cited by examiner

*Primary Examiner* — Rafael Pérez-Gutiérrez
*Assistant Examiner* — Joseph Arévalo
(74) *Attorney, Agent, or Firm* — Maschoff Gilmore & Israelsen

(57) ABSTRACT

An electronic apparatus includes a first section and a second section which are foldable together in: a first mode in which respective front faces of the first and second sections face each other, and a second mode in which the front face of the first section faces a back face of the second section. A contact protector is provided on the front face of the first section. In the first mode, a first portion of the contact protector contacts the front face of the second section and forms a first clearance between the respective front faces, and a second portion of the contact protector is accommodated in a dent in the front face of the second section. In the second mode, the second portion of the contact protector contacts the back face of the second section and forms a second clearance between the respective front faces.

4 Claims, 18 Drawing Sheets

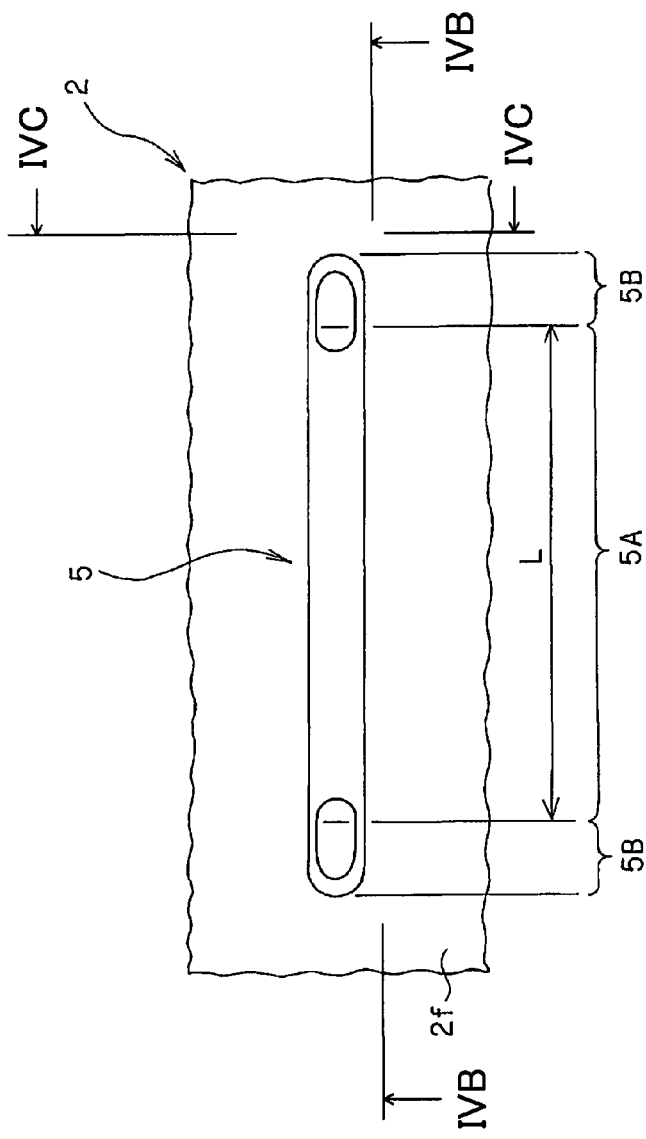
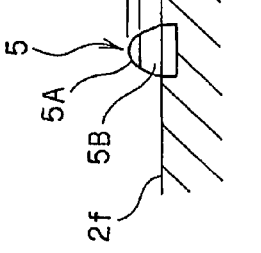
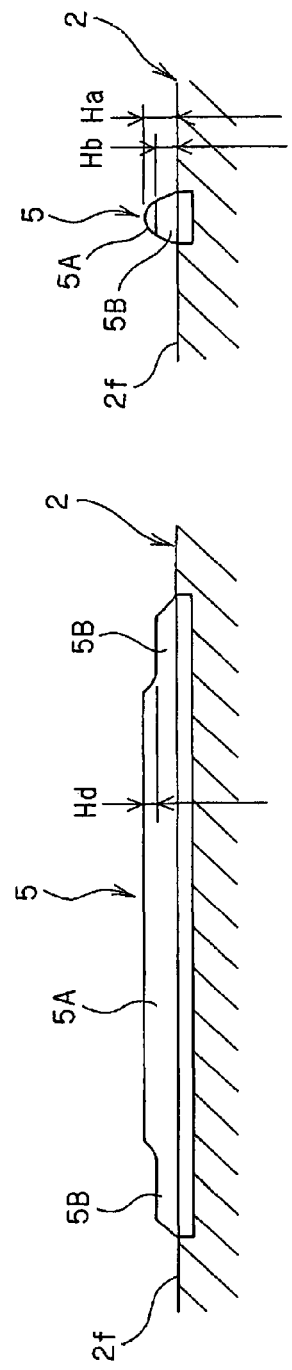
FIG. 4A
FIG. 4C
FIG. 4B (b)

(a)

(b)

ELECTRONIC APPARATUS FORMED BY NO LESS THAN TWO SECTIONS

CROSS REFERENCE TO RELATED APPLICATIONS

This application is based upon and claims the benefit of priority from the prior Japanese Patent Application No. 2006-134547 filed on May 12, 2006; the entire contents of which are incorporated herein by reference.

BACKGROUND OF THE INVENTION

1. Field of the Invention

The present invention relates to an electronic apparatus formed by no less than two sections, and in particular to an electronic apparatus having sections which are movably connected to each other.

2. Description of the Related Art

As an example of a conventional electronic apparatus, a mobile phone designed to be easily used as well as to be compact for portability and to be used in various ways is disclosed in Japanese Patent Publication (Kokai), No. 2005-354456. More specifically, as shown in FIGS. 16-18, the mobile phone A disclosed in JP 2005-354456 has a lower section (first section) B and an upper section (second section) C, which are foldably and rotationally connected by a rotating two-axis hinge. The lower section B is formed as a main body and has, on a front face Bf, a microphone Bm and user controls Ba including a plurality of operation keys. The upper section C has, on a front face Cf, a speaker Cr and a liquid crystal display (LCD) Cd of a significant size.

The lower section B and the upper section C are foldably connected around a folding axis x as shown by an arrow F in FIG. 16B, and are rotationally connected around a flipping axis z which is perpendicular to the folding axis x as shown by an arrow R in FIGS. 16A and 16B, through a connection D including a rotating two-axis hinge (not shown).

The mobile phone A thereby has four mechanical modes, namely a closed mode, an open mode, a flipped-open mode and a flipped-closed mode, as follows. The "closed mode" is a state of the mobile phone A in which the lower section B and the upper section C are closed with respect to each other while the front face Bf faces the front face Cf. See FIG. 17B. The mobile phone A may shift from the closed mode to the "open mode," in which the upper section C is open with respect to the lower section B by a degree defined by an open attitude. See FIG. 17A. The mobile phone A may shift from the open mode to the "flipped-open" mode by flipping the upper section C by 180 degrees. See FIG. 18A. The mobile phone A may shift from the flipped-open mode to the "flipped-closed" mode by closing the upper section C with respect to the lower section B while the front face Bf of the lower section B faces a back face Cb of the upper section C, and while the LCD Cd is exposed outwards. See FIG. 18B.

There are an increasing number of foldable mobile phones having a clearance pad for forming a certain clearance (gap) between a first section and a second section while the first and second sections are closed with respect to each other, as disclosed in Japanese Patent Publication (Kokai), No. 2004-128814.

For example, with respect to mobile phone A shown in FIGS. 16-18, a pair of clearance pads, Q, Q are provided on the front face Bf of the lower section B. In the closed mode shown in FIG. 17B, a certain clearance g is formed between the front face Bf of the lower section B and the front face Cf of the upper section C by letting the front face Cf be in contact with the clearance pads, Q, Q.

Similarly, in the flipped-closed mode shown in FIG. 18B, a clearance g is formed between the front face Bf of the lower section B and the back face Cb of the upper section C by letting the back face Cb be in contact with the clearance pads, Q, Q.

A foldable mobile phone having a rotating two-axis hinge, like the mobile phone A described above, has to keep a relative position of the lower section B and the upper section C constant both in the closed mode and in the flipped-closed mode. This relative position to be kept constant includes the clearance between the lower section B and the upper section C, and a perspective view of the mobile phone A as a whole based on a parallel relationship between the lower section B and the upper section C. To keep this relative position constant, the front face Cf and the back face Cb of the upper section C have to be located at an equal distance (in a direction of depth) from the flipping axis z.

The upper section C of the mobile phone A thereby has to be designed in a simplest way in which both the front face Cf and the back face Cb are flat, thereby greatly reducing the degree of freedom of exterior design of the mobile phone A. For example, the mobile phone A may not be designed to be wedge-shaped in the closed mode by letting the back face Cb of the upper section C gradually curve toward the front face Cf as the back face Cb approaches an open end of the upper section C.

SUMMARY OF THE INVENTION

Accordingly, an object of the present invention is to provide an electronic device including a first section and a second section, where the electronic device may be designed with an improved degree of freedom of exterior design and may keep a relative position between the first section and the second section constant both in a closed mode and in a flipped-closed mode.

To achieve the above advantage, according to one aspect of the present invention an electronic apparatus includes a first section and a second section which are coupled by a connection section such that the first and second sections are foldably connected around a folding axis and are rotationally connected around a flipping axis which is perpendicular to the folding axis, such that the first section and the second section are foldable together in: (i) a first mode in which a front face of the first section faces a front face of the second section, and (ii) a second mode in which the front face of the first section faces a back face of the second section.

According to a first aspect of the present invention, a contact protector, which is provided on the front face of the first section, includes a first portion and a second portion, and a dent is provided in the front face of the second section. When the first section and the second section are folded together in the first mode, the first portion of the contact protector is in contact with the front face of the second section and forms a first clearance between the front face of the first section and the front face of the second section, and the second portion of the contact protector is accommodated in the dent in the front face of the second section so as not to interfere with formation of the clearance. And when the first section and the second section are folded together in the second mode, the second portion of the contact protector is in contact with the back face of the second section and forms a second clearance between the front face of the first section and the back face of the second section.

According to the first aspect, the contact protector may be a rod-like member having two end portions, in which the first portion of the contact protector includes the two end portions of the rod-like member, and the second portion of the contact protector includes a middle portion of the rod-like member between the two end portions, and the rod-like member may be a unitary member including both the first portion and the second portion.

According to a second aspect of the present invention, a first contact protector and a second contact protector are provided on the front face of the first section, and a dent is provided in the front face of the second section. When the first section and the second section are folded together in the first mode, the first contact protector is in contact with the front face of the second section and forms a first clearance between the front face of the first section and the front face of the second section, and the second contact protector is accommodated in the dent in the front face of the second section so as not to interfere with formation of the clearance. And when the first section and the second section are folded together in the second mode, the second contact protector is in contact with the back face of the second section and forms a second clearance between the front face of the first section and the back face of the second section.

According to the second aspect, the first contact protector may include two contact protector members provided on respective sides of the second contact protector.

According to a third aspect of the present invention, a first contact protector is provided on the front face of the second section, a second contact protector provided on the front face of the first section, and a dent provided in the front face of the second section. When the first section and the second section are folded together in the first mode, the first contact protector is in contact with the front face of the first section and forms a first clearance between the front face of the first section and the front face of the second section, and the second contact protector is accommodated in the dent in the front face of the second section so as not to interfere with formation of the clearance. And when the first section and the second section are folded together in the second mode, the second contact protector is in contact with the back face of the second section and forms a second clearance between the front face of the first section and the back face of the second section.

According to the third aspect, the first contact protector may include two contact protector members provided on respective sides of the dent.

BRIEF DESCRIPTION OF THE DRAWINGS

FIG. 4A is an enlarged partial front view of a clearance pad of the first embodiment; FIG. 4B is an enlarged partial sectional view along lines IVB-IVB in FIG. 4A; and FIG. 4C is an enlarged partial end sectional view along line IVC-IVC in FIG. 4A.

DETAILED DESCRIPTION

Figure 1:
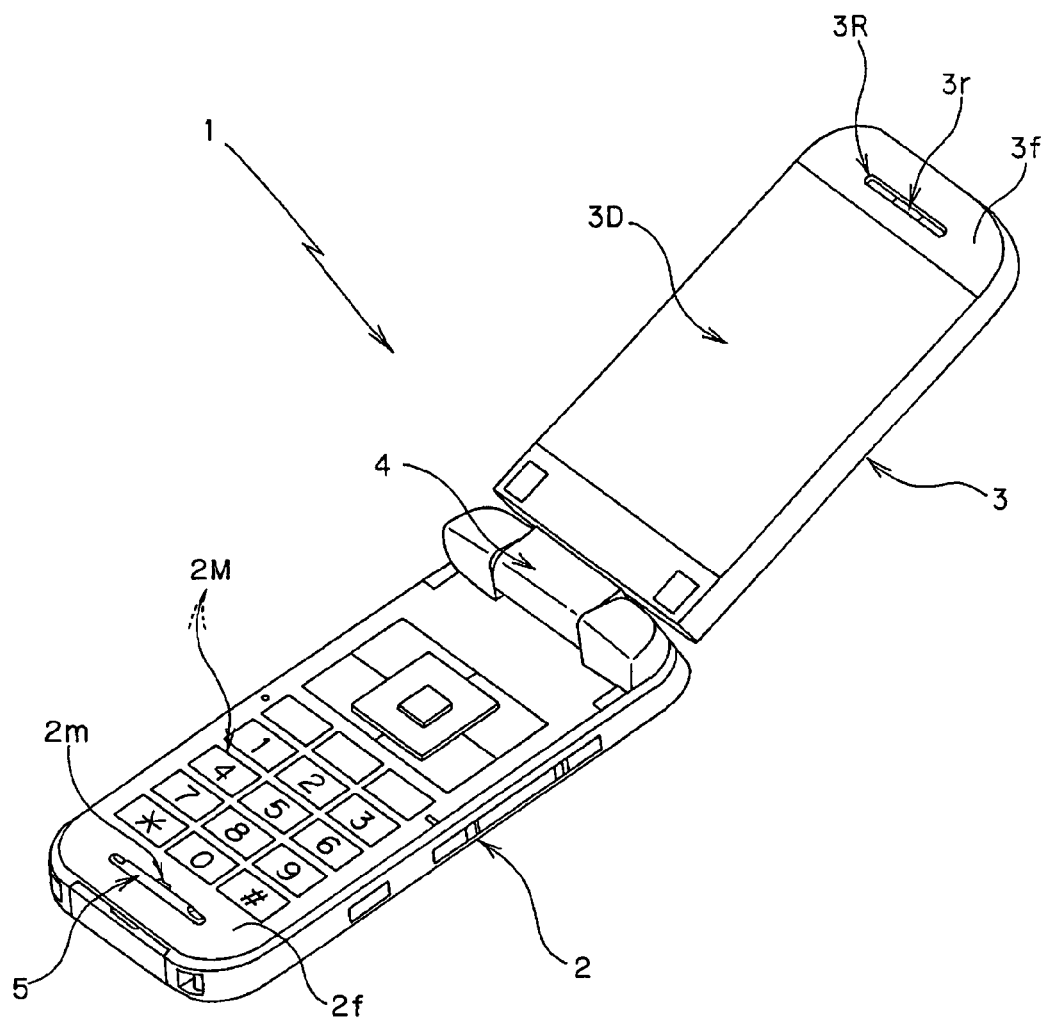
FIG. 1 is a perspective view of a mobile phone of a first embodiment of the present invention in an open mode.
Figure 2A:
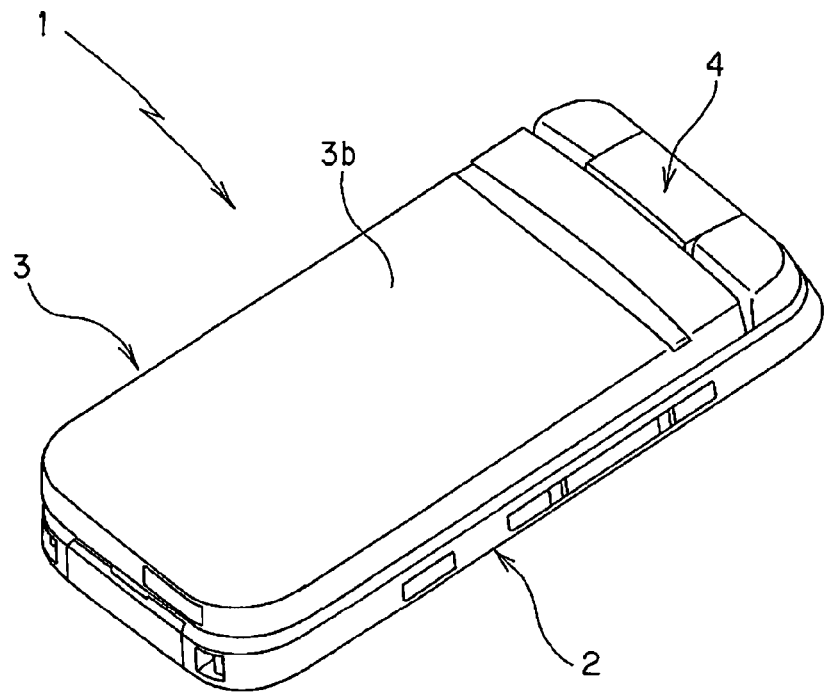
FIGS. 2A and 2B are perspective views of the mobile phone of the first embodiment in a closed mode and in a flipped-closed mode, respectively.
Figure 2B:
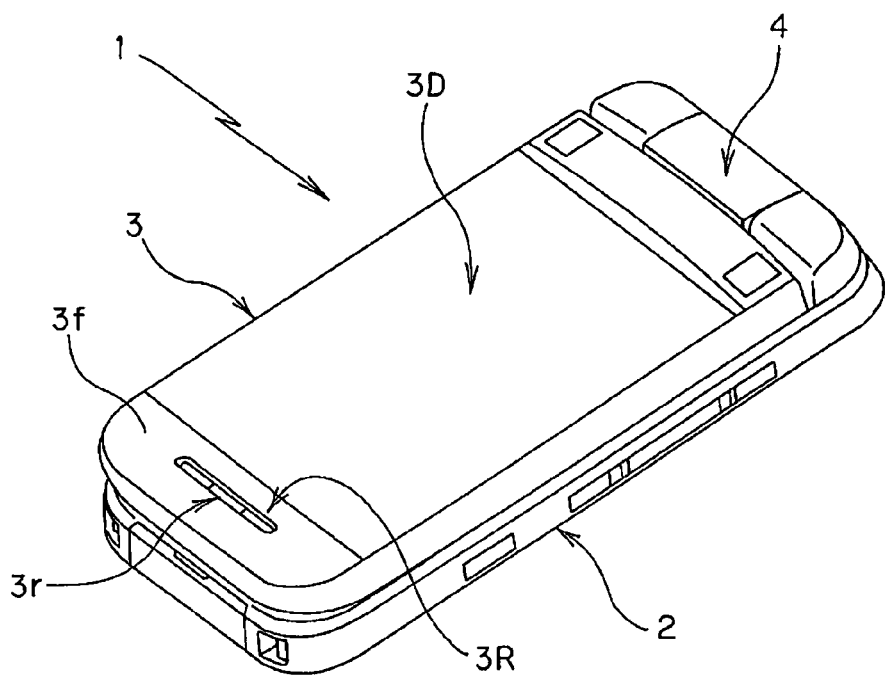

A first embodiment of the present invention will be described with reference to FIGS. 1-9. FIGS. 1-3 show a foldable mobile phone 1 as an example of an electronic apparatus of the first embodiment. As shown in FIG. 1, the mobile phone 1 has a lower section (first section) 2 formed as a main body and an upper section (second section) 3 formed as a lid.

The lower section 2 has, on a front face 2$f$, a microphone 2$m$ and user controls 2M including a plurality of operation keys. The upper section 3 has, on a front face 3*f*, a speaker 3*r* and a liquid crystal display (LCD) 3D of a significant size.

Figure 3A:
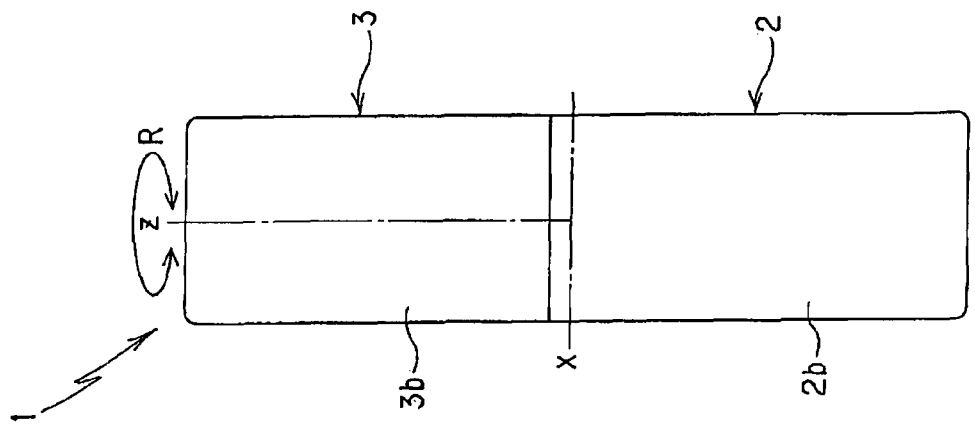
FIGS. 3A, 3B and 3C are a front view, a side view and a rear view, respectively, of the mobile phone of the first embodiment.
Figure 3B:
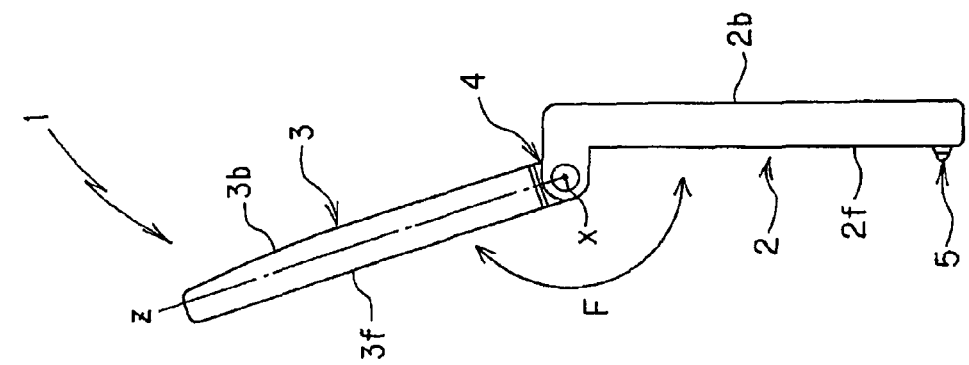
Figure 3C:
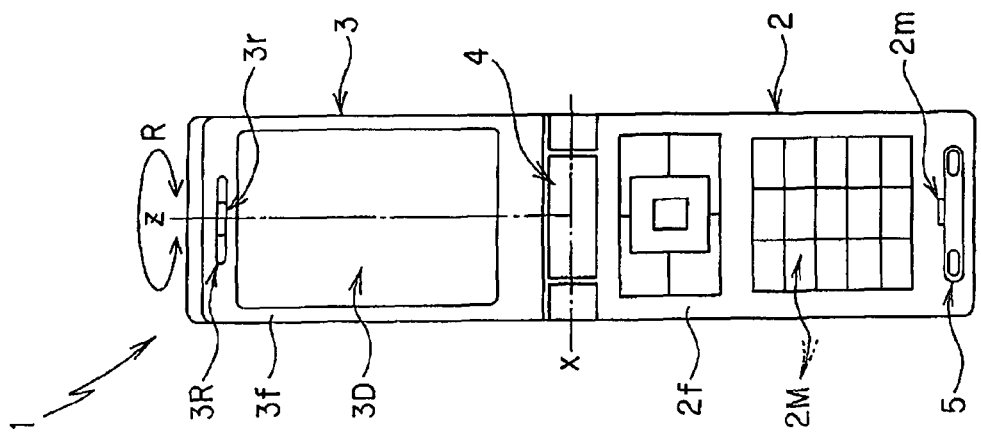

The lower section 2 and the upper section 3 are foldably connected around a folding axis x as shown by an arrow F in FIG. 3B, and are rotationally connected around a flipping axis z which is perpendicular to the folding axis x as shown by an arrow R in FIGS. 3A and 3C, through a connection 4 (a connection section) including a rotating two-axis hinge (not shown).

In the following, the term "open end" of the lower section 2 refers to the end of the lower section 2 farthest from the connection 4 (that is, the end at the bottom of FIG. 3A, for example), and the term "open end" of the upper section 3 refers to the end of the upper section 3 farthest from the connection 4 (that is, the end at the top of FIG. 3A, for example).

The mobile phone 1 thereby has four mechanical modes, namely a closed mode, an open mode, a flipped-open mode and a flipped-closed mode, as follows. The "closed mode" is a state of the mobile phone 1 in which the lower section 2 and the upper section 3 are closed with respect to each other while the front face 2*f* faces the front face 3*f*. See FIG. 2A or FIG. 6B, for example. The mobile phone 1 may shift from the closed mode to the "open mode," in which the upper section 3 is open with respect to the lower section 2 by a degree defined by an open attitude around the folding axis x. See FIG. 6A, for example. The mobile phone 1 may shift from the open mode to the "flipped-open" mode by flipping the upper section 3 by 180 degrees around the flipping axis z. See FIG. 8A, for example. The mobile phone 1 may shift from the flipped-open mode to the "flipped-closed" mode by closing the upper section 3 with respect to the lower section 2 while the front face 2*f* of the lower section 2 faces a back face 3*b* of the upper section 3, and while the LCD 3D is exposed outwards. See FIG. 2B or FIG. 8B, for example.

The front face 2*f* of the lower section 2 and the front face 3*f* of the upper section 3 are both planar, and the back face 3*b* of the upper section 3 is curved such that the back face 3*b* gradually curves inward toward the front face 3*f* as the back face 3*b* approaches the open end of the upper section 3. The mobile phone 1 is thereby designed to be wedge-shaped in the closed mode.

As shown in FIG. 1, FIG. 3A and FIG. 3B, the front face 2*f* of the lower section 2 has a clearance pad (a contact protector) 5 near the microphone 2*m* located close to the open end of the lower section 2. The front face 3*f* of the upper section 3 has an accommodation dent 3R made at a location close to the open end of the lower section 3. The accommodation dent 3R is positioned and shaped so as to meet and accommodate the clearance pad 5 when the mobile phone 1 is in the closed mode.

As shown in FIG. 4, the clearance pad 5 is rod-like and extends in a width direction of the lower section 2. The clearance pad 5 is made of a suitable elastic material such as an elastomer(s).

The clearance pad 5 includes a pair of front face pad portions 5B, 5B provided at each end thereof as shown in FIGS. 4A and 4B. Each of the pair of front face pads portions 5B, 5B may serve as a first contact protector. The clearance pad 5 also includes, at a middle portion thereof, a back face pad portion 5A, which may serve as a second contact protector. According to the first embodiment, the back face pad portion 5A and the front face portions 5B, 5B are formed together in a single unit (the clearance pad 5), as shown in FIG. 4B, for example. However, each of the front face pad portions 5B, 5B and the back face pad portion 5A may be provided as a separate member. (For example, see the disclosure of the second embodiment below). As seen in FIGS. 4B and 4C, the back face pad portion 5A has a height Ha and is taller than the front face pad portions 5B, 5B, which have a height Hb. The difference between height Ha and Hb is Hd as seen in FIGS. 4B and 4C.

Figure 5A:
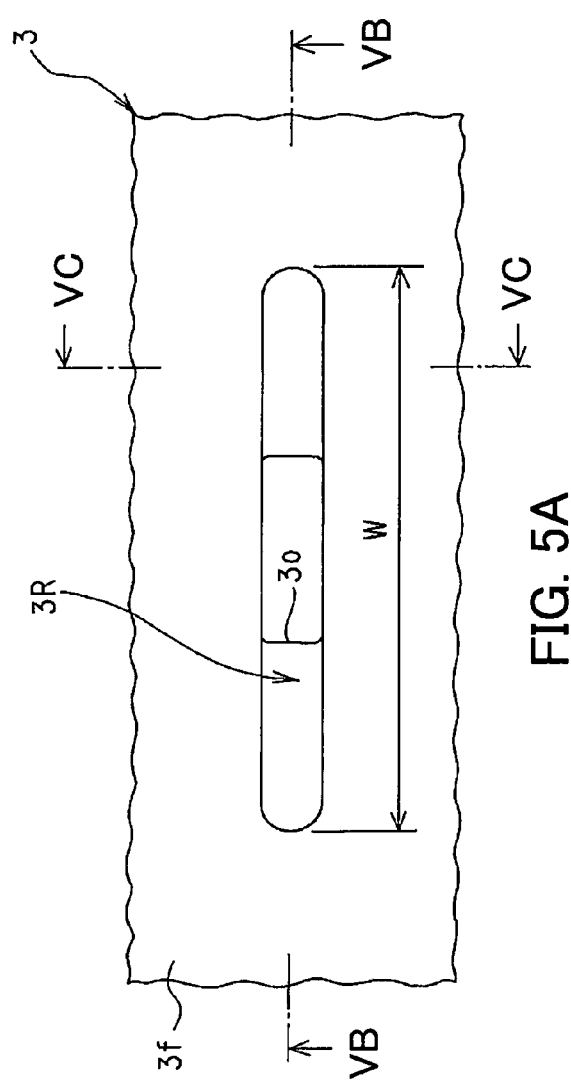
FIG. 5A is an enlarged partial front view of an accommodation dent of the first embodiment.
Figure 5B:
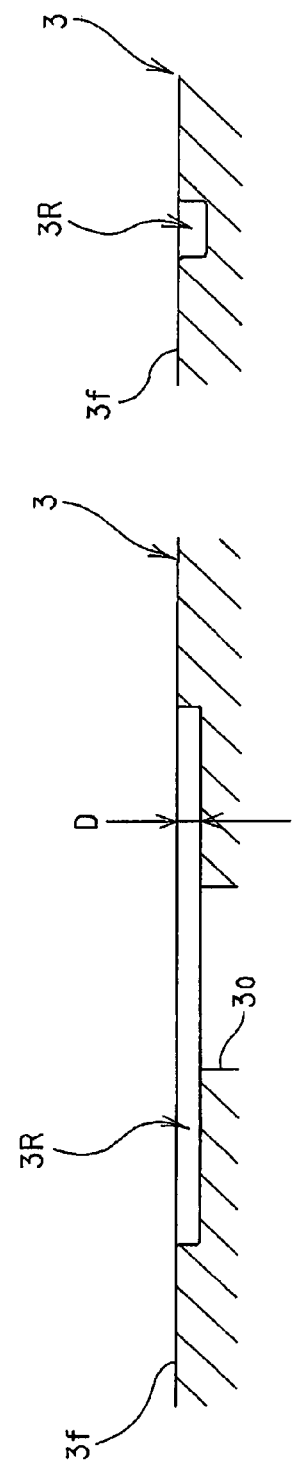
FIG. 5B is an enlarged partial sectional view along lines VB-VB in FIG. 5A.
Figure 5C:
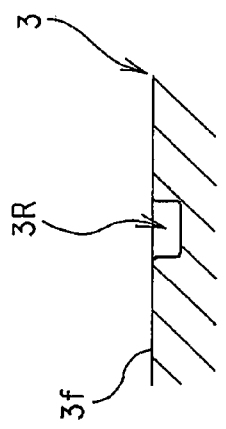
FIG. 5C is an enlarged partial sectional view along line VC-VC in FIG. 5C.

As shown in FIGS. 5A, 5B and 5C, the accommodation dent 3R is a long hole extending in a width direction of the upper section 3. At a middle portion of the bottom of the hole, a sound aperture 3*o* for the speaker 3*r* is provided.

The back face pad portion 5A of the clearance pad 5 has a long side length L (see FIG. 4A) and the accommodation dent 3R has a long side length W (see FIG. 5A). The length W of the accommodation dent 3R is slightly greater than the length L of the back face pad portion 5A. As shown in FIG. 4B, the back face pad portion 5A is taller than the front face pad portions 5B, 5B by a difference of height Hd, and as shown in FIG. 5B, the accommodation dent 3R has a depth D. The depth D is slightly larger than the difference of height Hd.

Figure 6A:
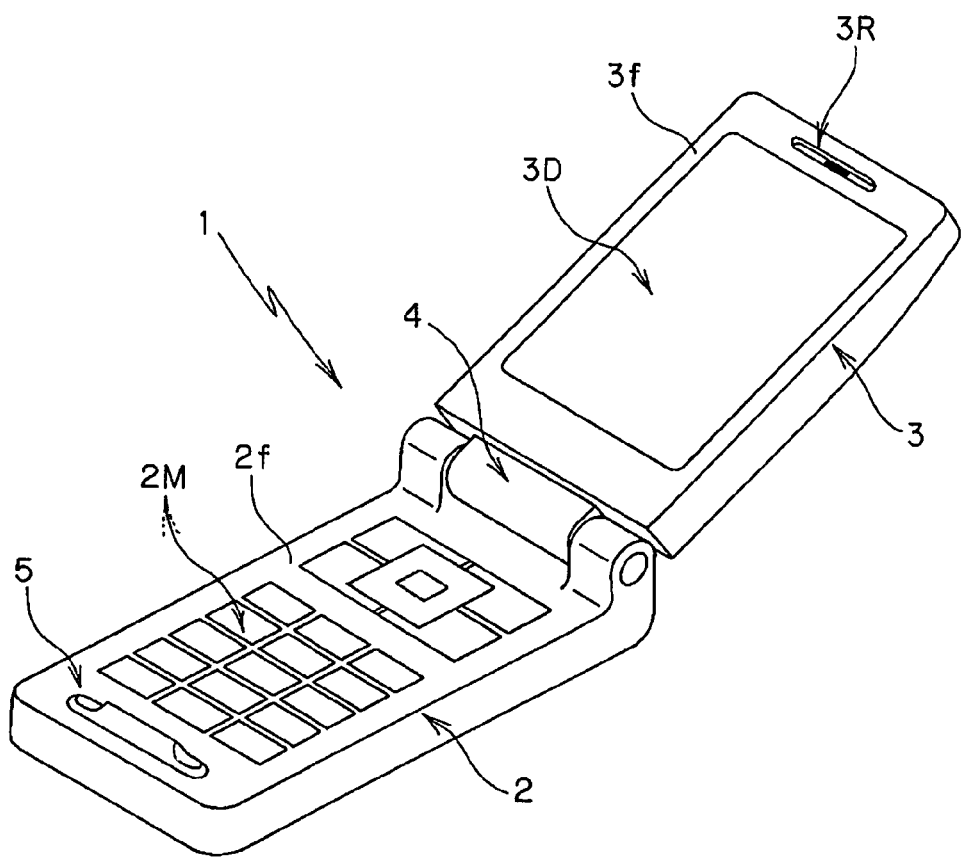
FIGS. 6A and 6B are perspective views of the mobile phone of the first embodiment in the open mode and in the closed mode, respectively.
Figure 6B:
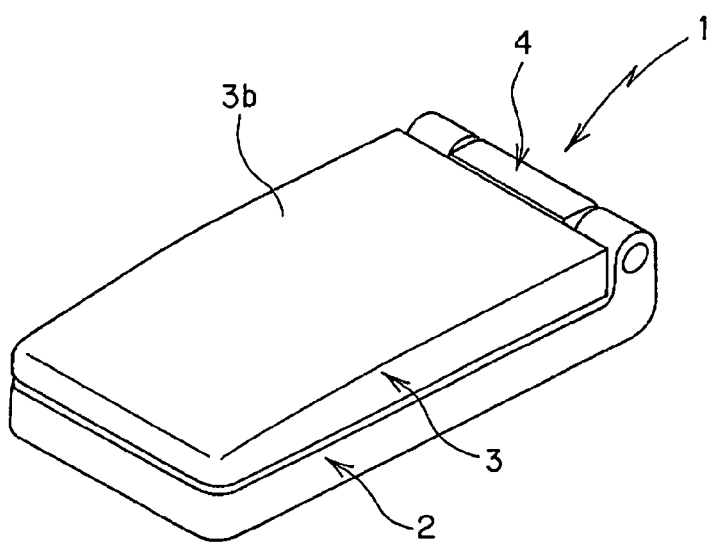
Figure 7A:
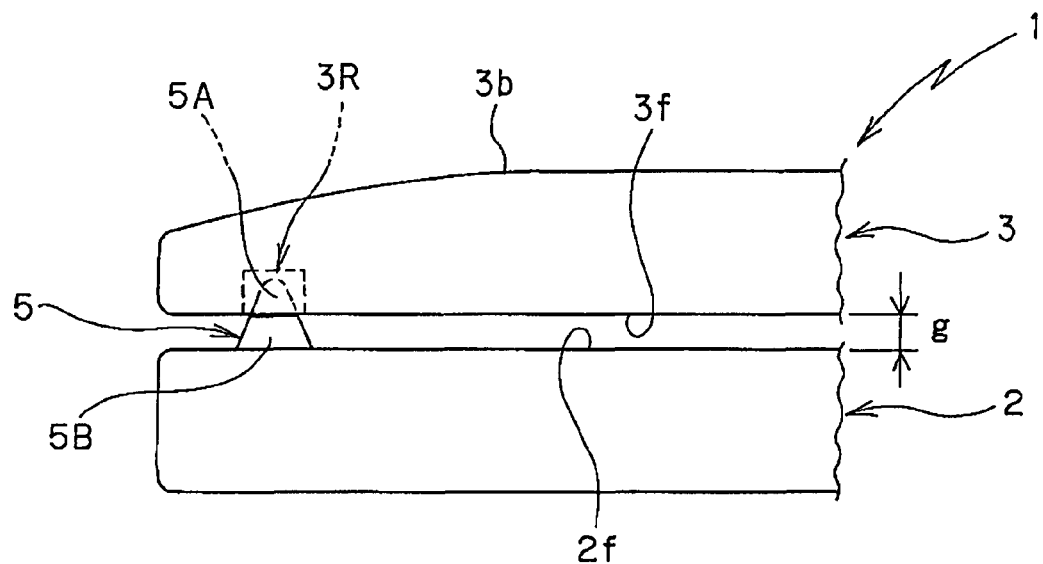
FIG. 7A is an enlarged partial side view of the mobile phone of the first embodiment in the closed mode to show operation of the clearance pad of the first embodiment.
Figure 7B:
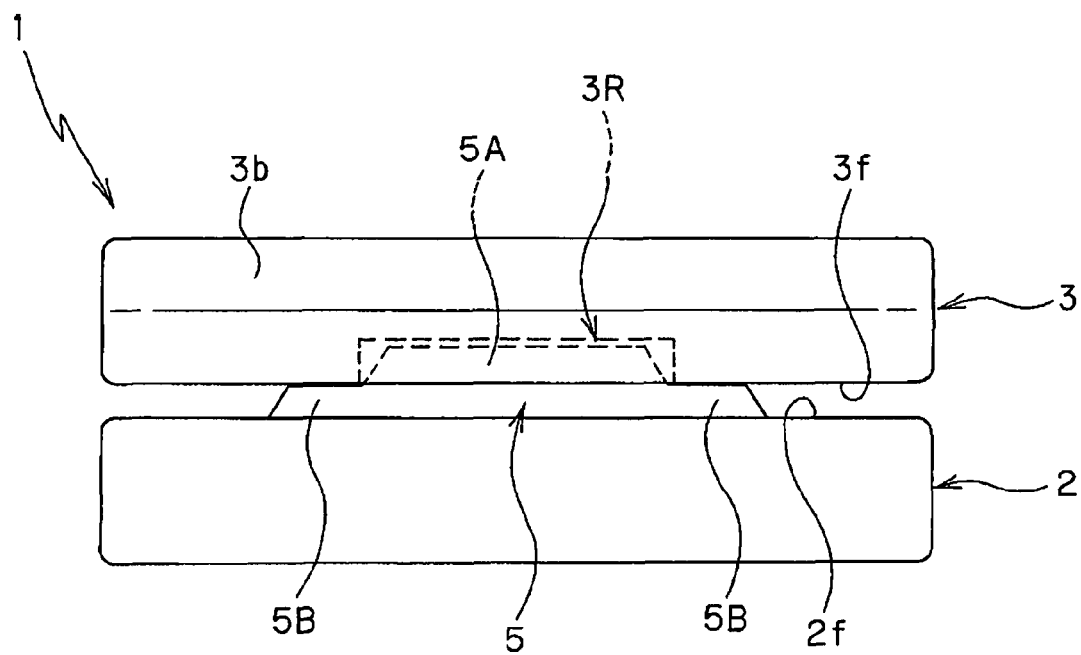
FIG. 7B is an enlarged end view of the mobile phone of the first embodiment in the closed mode to show operation of the clearance pad of the first embodiment.

If the mobile phone 1 shifts from the open mode shown in FIG. 6A to the closed mode shown in FIG. 6B by closing the upper section 3 with respect to the lower section 2, the front face pad portions 5B, 5B of the clearance pad 5 come into contact with the front face 3*f* of the upper section 3 as shown in FIGS. 7A and 7B. Meanwhile, the back face pad portion 5A is accommodated by the accommodation dent 3R in the front face 3*f* of the upper section 3, as shown in FIGS. 7A and 7B. A certain clearance g is thereby formed between the front face 2*f* of the lower section 2 and the front face 3*f* of the upper section 3, since the front face 3*f* of the upper section 3 is supported by the front face pad portions 5B, 5B. Since the back face pad portion 5A is accommodated in the accommodation dent 3R, the back face pad portion 5A does not interfere with maintaining the clearance g using the front face pad portions 5B, 5B.

Figure 8A:
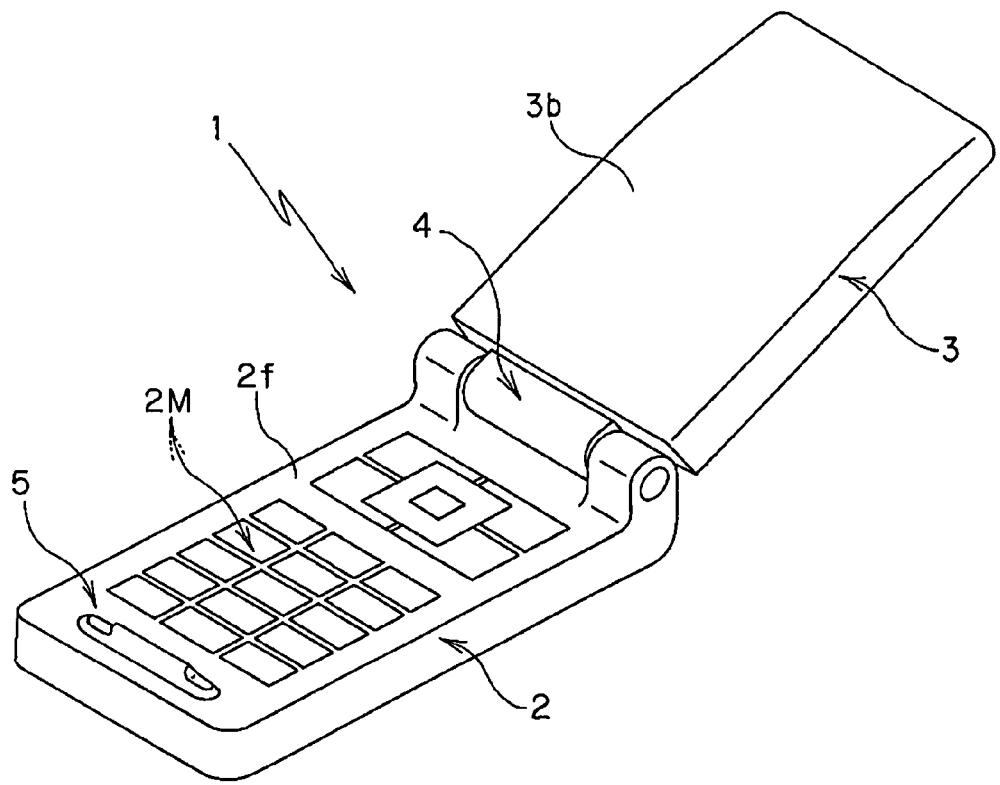
FIGS. 8A and 8B are perspective views of the mobile phone of the first embodiment in the flipped-open mode and in the flipped-closed mode, respectively.
Figure 8B:
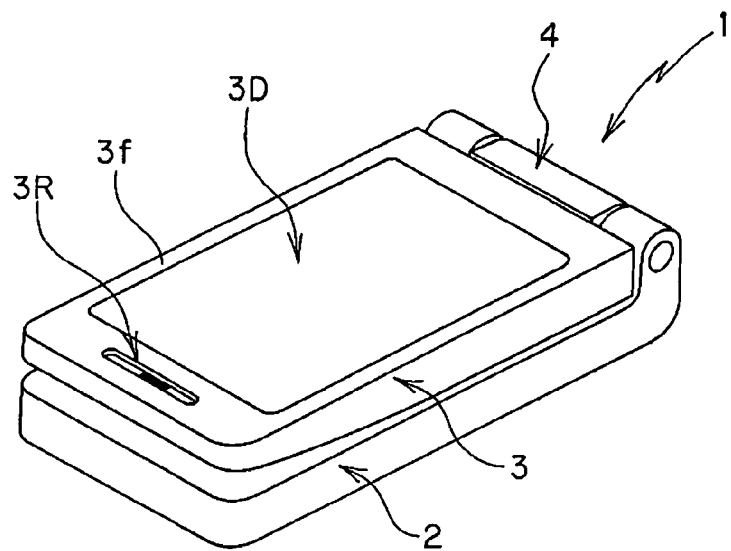
Figure 9A:
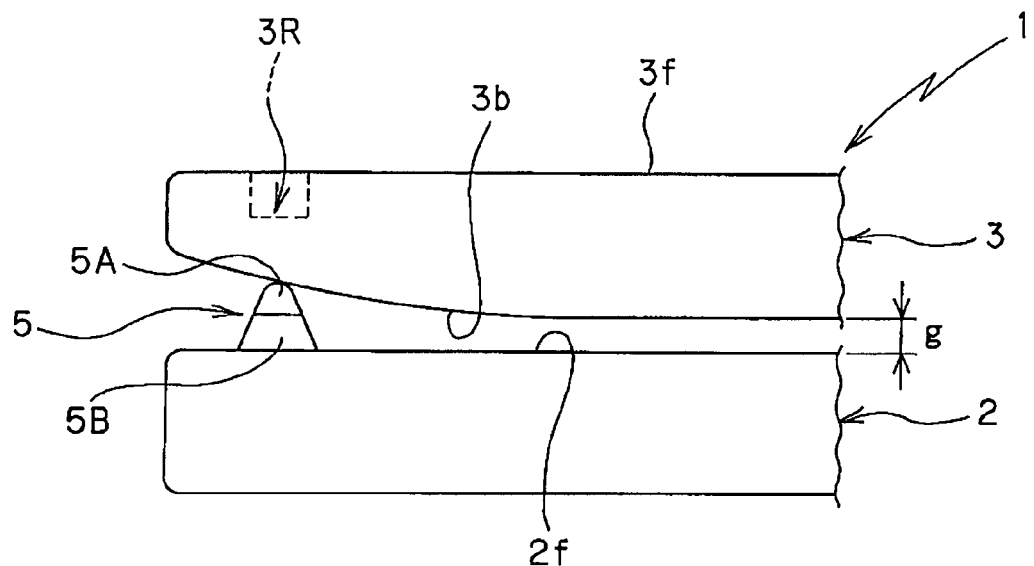
FIG. 9A is an enlarged partial side view of the mobile phone of the first embodiment in the flipped-closed mode to show operation of the clearance pad of the first embodiment.
Figure 9B:
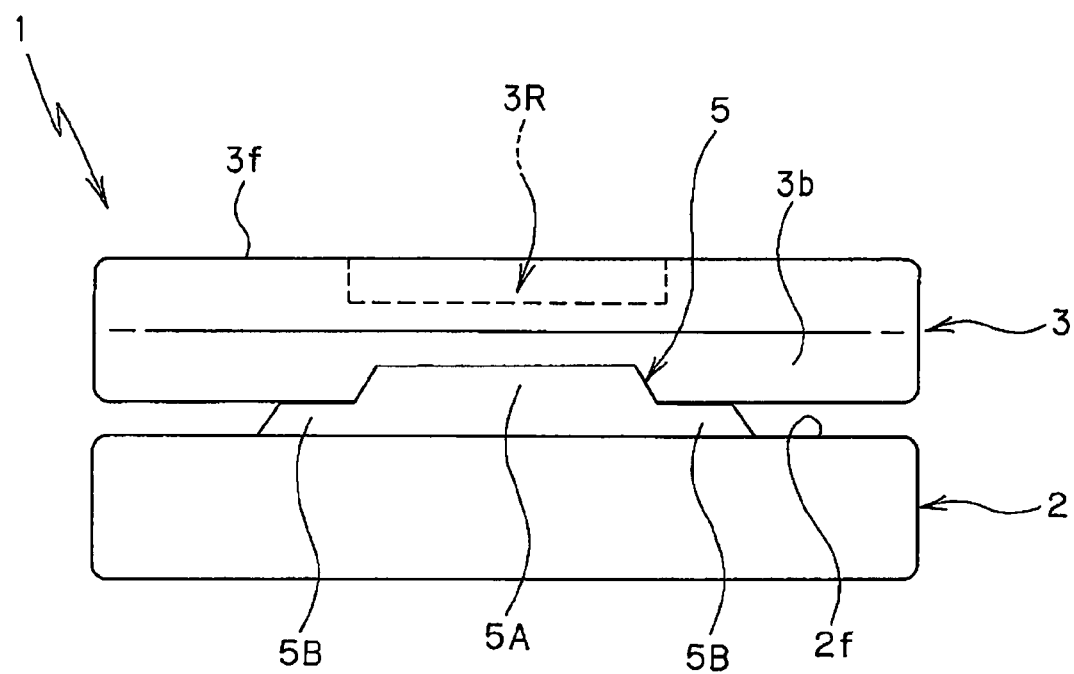
FIG. 9B is an enlarged end view of the mobile phone of the first embodiment in the flipped-closed mode to show operation of the clearance pad of the first embodiment.

If the mobile phone 1 shifts from the flipped-open mode shown in FIG. 8A to the flipped-closed mode shown in FIG. 8B by closing the upper section 3 (which has been flipped by 180 degrees about the flipping axis z) with respect to the lower section 2, the back face pad portion 5A of the clearance pad 5 comes into contact with the back face 3*b* of the upper section 3 as shown in FIGS. 9A and 9B. The clearance g is thereby formed between the front face 2*f* of the lower section 2 and the back face 3*b* of the upper section 3, by supporting the back face 3*b* of the upper section 3 by the back face pad portion 5A.

Thus, in the flipped-closed mode, as seen in FIGS. 9A and 9B, the back face pad portion 5A, which is taller than the front face pad portions 5B, 5B, comes into contact with the open end portion (see FIG. 9A) of the curved back face 3*b* of the upper section 3. Thereby, as shown in FIG. 9A, the clearance g is formed between the front face 2*f* of the lower section 2 and the back face 3*b* of the upper section 3 and a relative position of the lower section 2 and the upper section 3 is kept constant, both in the closed mode and in the flipped-closed mode. (In the flipped-closed mode, the clearance between the lower section 2 and the upper section 3 widens outward from the clearance g at the tip end of the upper section 3, due to the curving of the back face 3*b*.)

In other words, the back face 3*b* of the upper section 3 may be gradually curved toward the front face 3*f* as the back face 3*b* approaches the open end of the upper section 3, and the clearance g may still be formed and the relative position of the lower section 2 and the upper section 3 may be kept constant in the closed and flipped-closed modes, due to the clearance pad 5 having the back face pad portion 5A with the height Ha and the front face pad portions 5B, 5B with the height Hb that is smaller than the height Ha, and due to the accommodation dent 3R in the front face 3*f* of the upper section 3.

According to the first embodiment of the present invention described above, the mobile phone 1 includes, on the front face 2*f* of the lower section 2, the front face pad portions (first contact protector) 5B, 5B which come into contact with the front face 3*f* of the upper section 3 in the closed mode, and the back face pad portion (second contact protector) 5A which comes into contact with the back face 3*b* of the upper section 3 in the flipped-closed mode. With this structure, front face 3*f* and the back face 3*b* may thereby be shaped differently, so that the degree of freedom of exterior design of the mobile phone 1 may be highly improved.

As described above, the mobile phone 1 of the first embodiment has the clearance pad 5 on the front face 2*f* of the lower section 2, and the clearance pad 5 includes the front face pad portions 5B, 5B as the first contact protector and the back face pad portion 5A as the second contact protector. With the structure described above, the front face pad portions 5B, 5B and the back face pad portion 5A are formed/shaped together as a unit. However, a shape or an arrangement of each of the first contact protector and the second contact protector may be modified in various ways, and are not limited to the shape and arrangement of the first embodiment.

Figure 10:
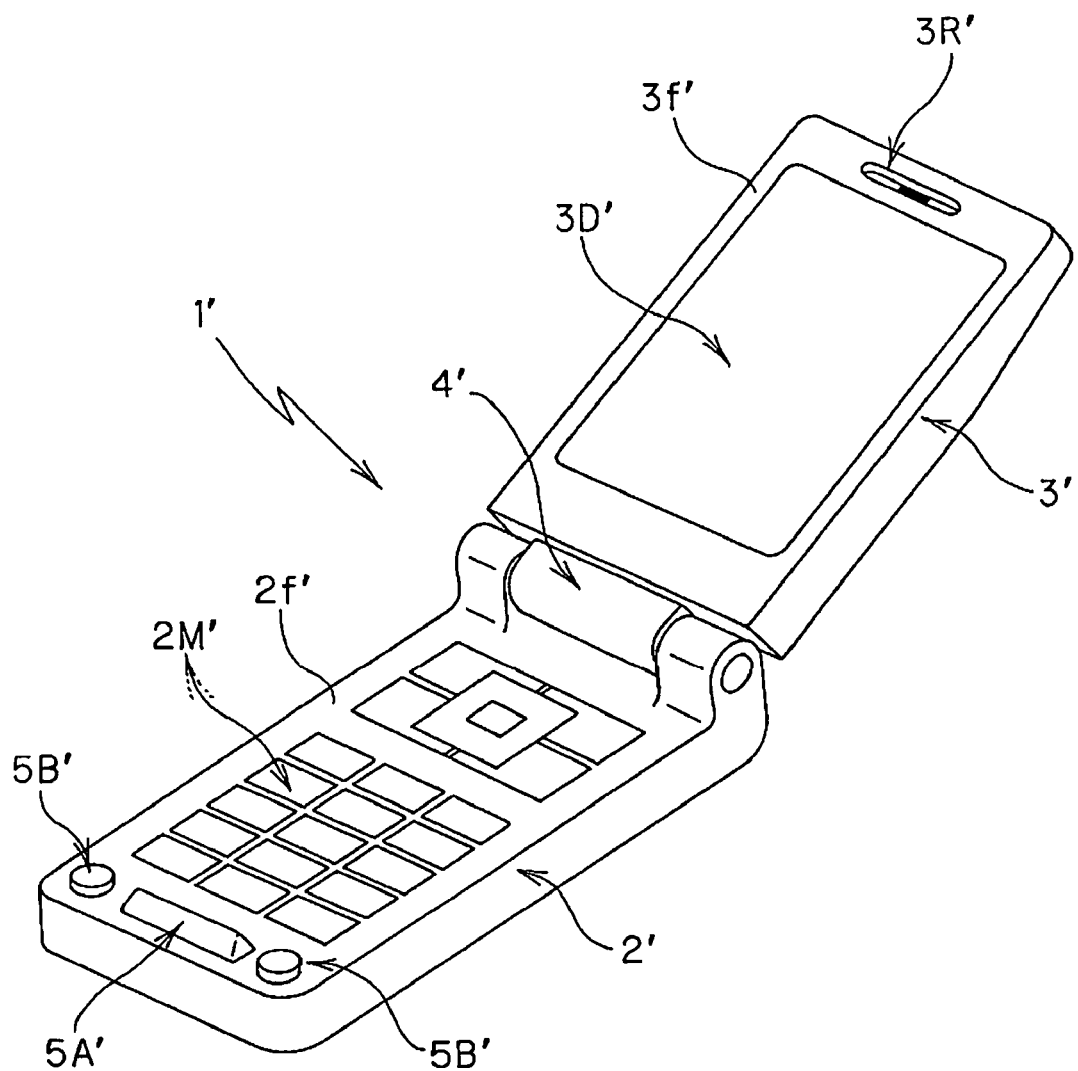
FIG. 10 is a perspective view of a mobile phone of a second embodiment of the present invention in the open mode.

A second embodiment of the present invention will be described with reference to FIGS. 10-12. FIG. 10 is a perspective view of a foldable mobile phone 1' of the second embodiment. As shown in FIG. 10, the mobile phone 1' has a lower section 2' and an upper section 3'.

The configuration of the mobile phone 1' of the second embodiment is the same as the configuration of the mobile phone 1 of the first embodiment, except for shapes and arrangements of clearance pads, as described below. Therefore, in the explanation of the second embodiment below, each portion of the mobile phone 1' which is the same as a portion of the mobile phone 1 of the first embodiment is given a same reference numeral with a prime (') notation, and an explanation thereof is omitted.

The mobile phone 1' has, on the front face 2*f* of the lower section 2' close to the open end of the lower section 2', a center clearance pad 5A' which may serve as a second contact protector. The mobile phone 1' also has, on both sides of the center clearance pad 5A', a pair of side clearance pads 5B', 5B', each of which may serve as a first contact protector.

The front face 3*f* of the upper section 3' has an accommodation dent 3R' made at a location close to the open end of the front face 3*f*. The accommodation dent 3R' is positioned and shaped so as to meet and accommodate the clearance pad 5A' when the mobile phone 1' is in the closed mode.

Figure 11A:
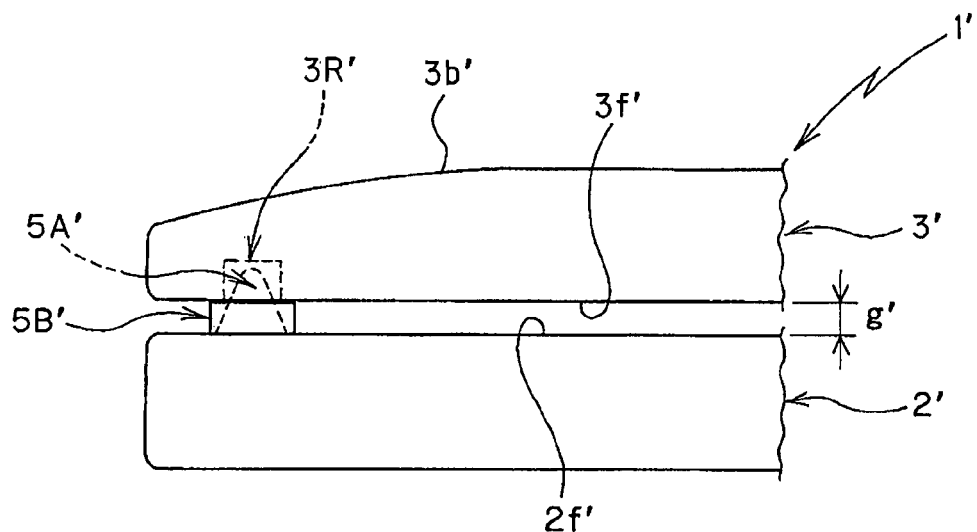
FIG. 11A is an enlarged partial side view of the mobile phone of the second embodiment in the closed mode to show operation of the clearance pads of the second embodiment.
Figure 11B:
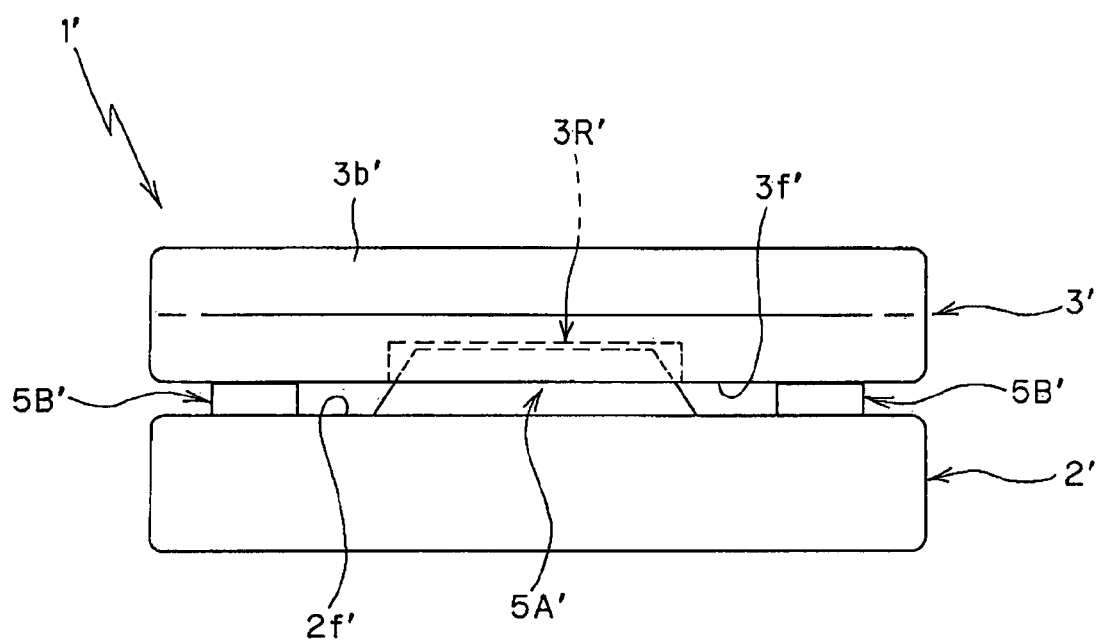
FIG. 11B is an enlarged end view of the mobile phone of the second embodiment in the closed mode to show operation of the clearance pads of the second embodiment.
Figure 12A:
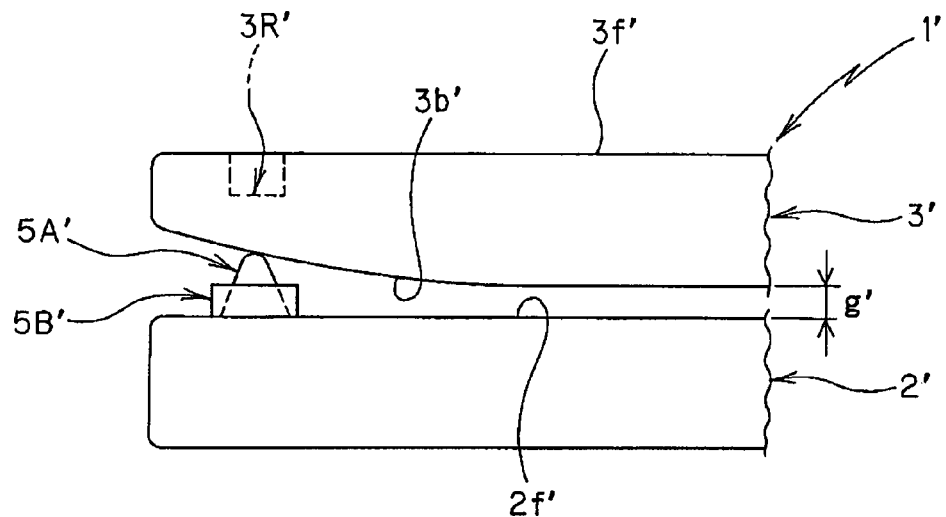
FIG. 12A is an enlarged partial side view of the mobile phone of the second embodiment in the flipped-closed mode to show operation of the clearance pads of the second embodiment.
Figure 12B:
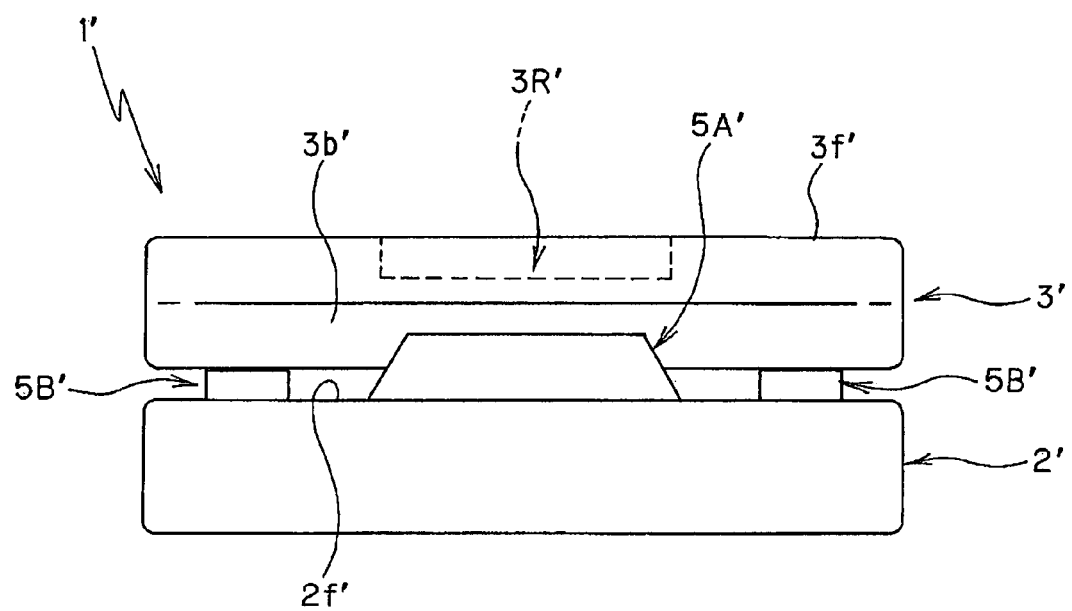
FIG. 12B is an enlarged end view of the mobile phone of the second embodiment in the flipped-closed mode to show operation of the clearance pads of the second embodiment.

If the mobile phone 1' is in the closed mode, as shown in FIGS. 11A and 11B, the side clearance pads 5B', 5B' are in contact with the front face 3*f* of the upper section 3'. Meanwhile, the center clearance pad 5A' is accommodated by the accommodation dent 3R' made in the front face 3*f* of the upper section 3'. A certain clearance g' is thereby formed between the front face 2*f* of the lower section 2' and the front face 3*f* of the upper section 3', since the front face 3*f* of the upper section 3' is supported by the side clearance pads 5B', 5B'. Since the center clearance pad 5A' is accommodated in the accommodation dent 3R', the center clearance pad 5A' does not interfere with maintaining the clearance g' using the side clearance pads 5B', 5B'. If the mobile phone 1' is in the flipped-closed mode, as shown in FIGS. 12A and 12B, the center clearance pad 5A' is in contact with the open end portion (see FIG. 12A) of the back face 3*b*' of the upper section 3'. The clearance g' is thereby formed between the front face 2*f* of the lower section 2' and the back face 3*b*' of the upper section 3', by supporting the back face 3*b*' of the upper section 3' by the center clearance pad 5A', as shown in FIG. 12A.

Thus, in the flipped-closed mode, as shown in FIGS. 12A and 12B, the center clearance pad 5A', which is taller than the side clearance pads 5B', 5B', is in contact with the open end portion of the curved back face 3*b*' of the upper section 3'. Thereby, as shown in FIG. 12A, the clearance g' is formed between the lower section 2' and the upper section 3', and a relative position of the lower section 2' and the upper section 3' is kept constant, both in the closed mode and in the flipped-closed mode. (In the flipped-closed mode, the clearance between the lower section 2' and the upper section 3' widens outward from the clearance g' at the tip end of the upper section 3', due to the curving of the back face 3*b*'.)

According to the second embodiment of the present invention described above, as according to the first embodiment, the front face 3*f* and the back face 3*b*' of the upper section 3' of the mobile phone 1' may be shaped differently so that the degree of freedom of exterior design of the mobile phone 1' may be highly improved.

Figure 13:
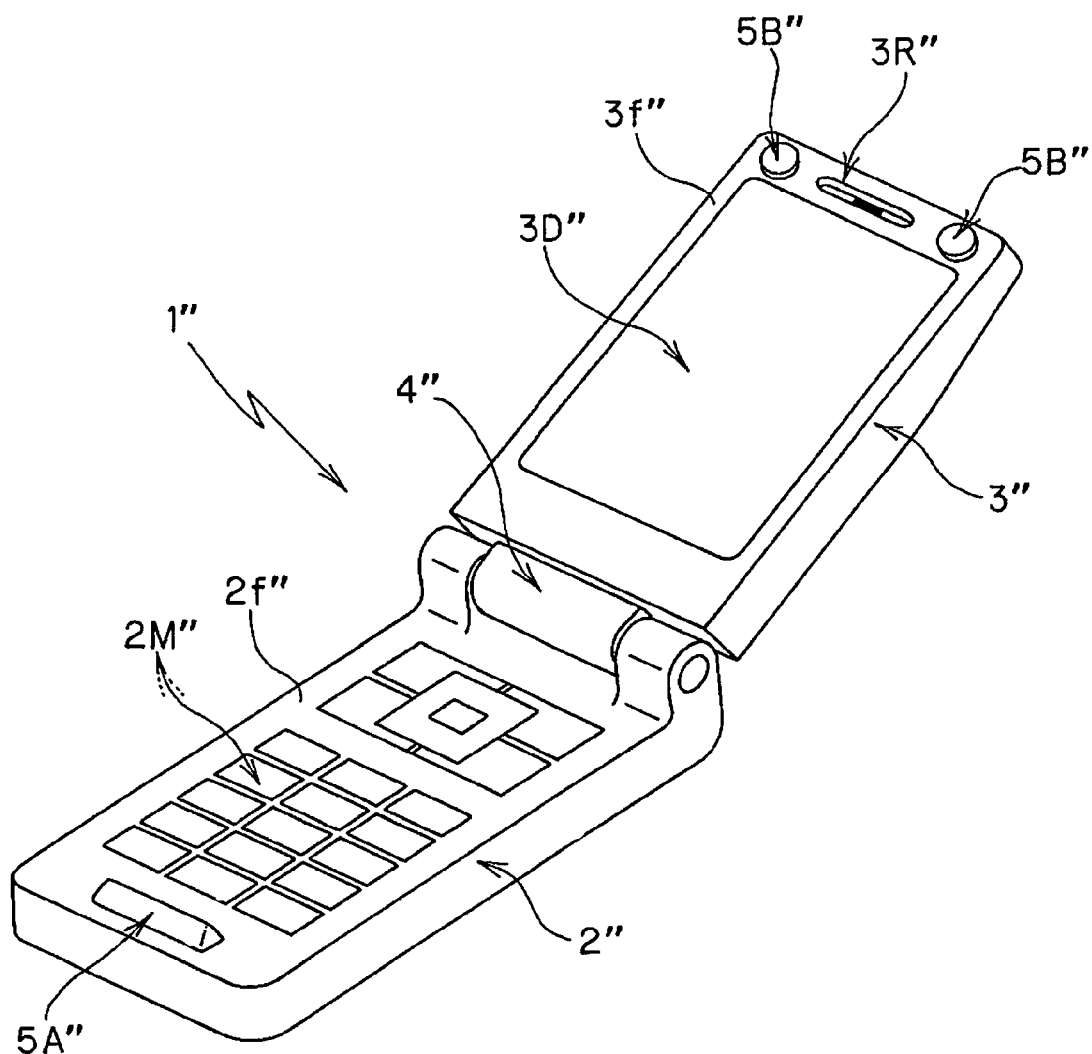
FIG. 13 is a perspective view of a mobile phone of a third embodiment of the present invention in the open mode.

A third embodiment of the present invention will be described with reference to FIGS. 13-15. FIG. 13 is a perspective view of a foldable mobile phone 1" of the third embodiment. As shown in FIG. 13, the mobile phone 1" has a lower section 2" and an upper section 3".

The configuration of the mobile phone 1" of the third embodiment is the same as the configuration of the mobile phone 1' of the second embodiment, except for arrangements of side clearance pads, as described below. Therefore, in the explanation of the third embodiment below, each portion of the mobile phone 1" which is the same as a portion of the mobile phone 1' of the second embodiment is given a same reference numeral with a double prime (") notation, and an explanation thereof is omitted.

The mobile phone 1" has, on the front face 2*f*" of the lower section 2" close to a central portion of the open end of the lower section 2", a center clearance pad 5A" which may serve as a second contact protector.

The front face 3*f*" of the upper section 3" has an accommodation dent 3R" made at a location close to the open end of the front face 3*f*. The accommodation dent 3R" is positioned and shaped so as to meet and accommodate the clearance pad 5A" when the mobile phone 1" is in the closed mode. The front face 3*f* of the upper section 3" also has a pair of side clearance pads 5B", 5B", each of which may serve as a first contact protector, on respective sides of the accommodation dent 3R".

Figure 14A:
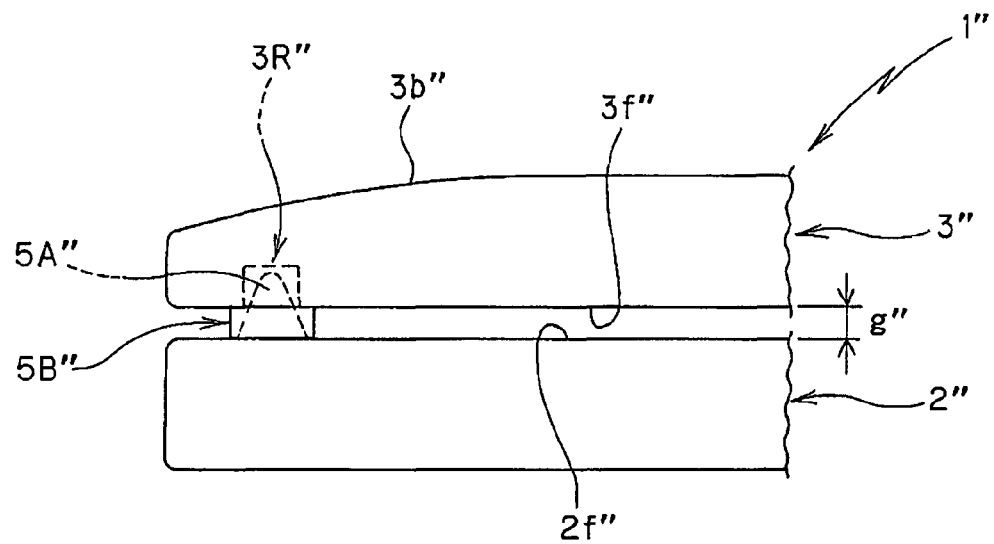
FIG. 14A is an enlarged partial side view of the mobile phone of the third embodiment in the closed mode to show operation of the clearance pads of the third embodiment.
Figure 14B:
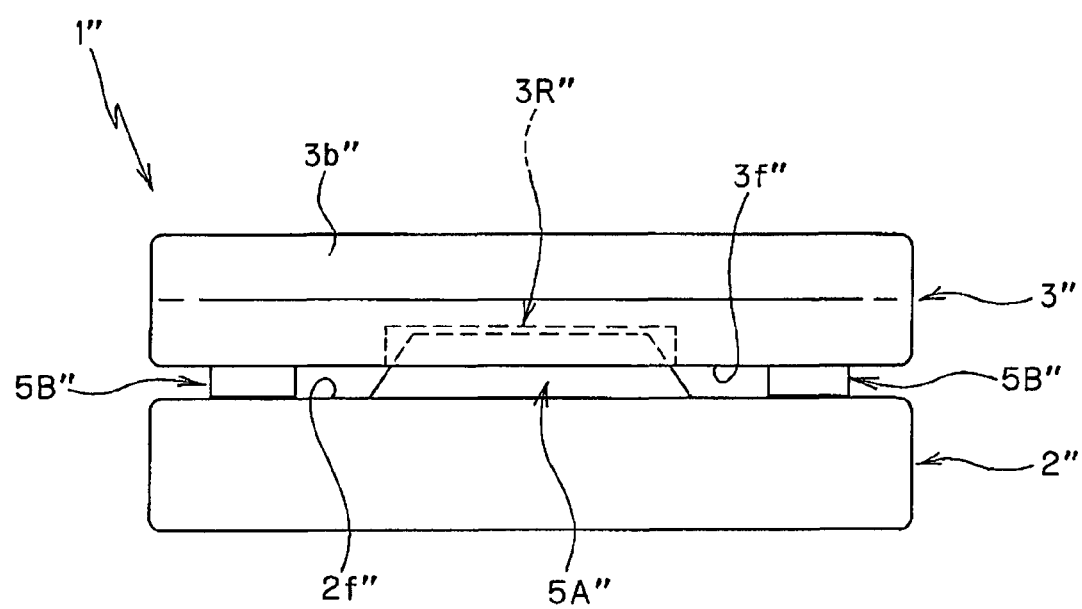
FIG. 14B is an enlarged end view of the mobile phone of the third embodiment in the closed mode to show operation of the clearance pads of the third embodiment.

If the mobile phone 1" is in the closed mode shown in FIGS. 14A and 14B, the side clearance pads 5B", 5B" are in contact with the front face 2*f* of the lower section 2". Meanwhile, the center clearance pad 5A" is accommodated by the accommodation dent 3R" made in the front face 3*f*" of the upper section 3". A certain clearance g" is thereby formed between the front face 2*f*" of the lower section 2" and the front face 3*f*" of the upper section 3", since the front face 3*f*" is supported by the side clearance pads 5B", 5B". Since the center clearance pad 5A" is accommodated in the accommodation dent 3R", the center clearance pad 5A" does not interfere with maintaining the clearance g" using the side clearance pads 5B", 5B".

Figure 15A:
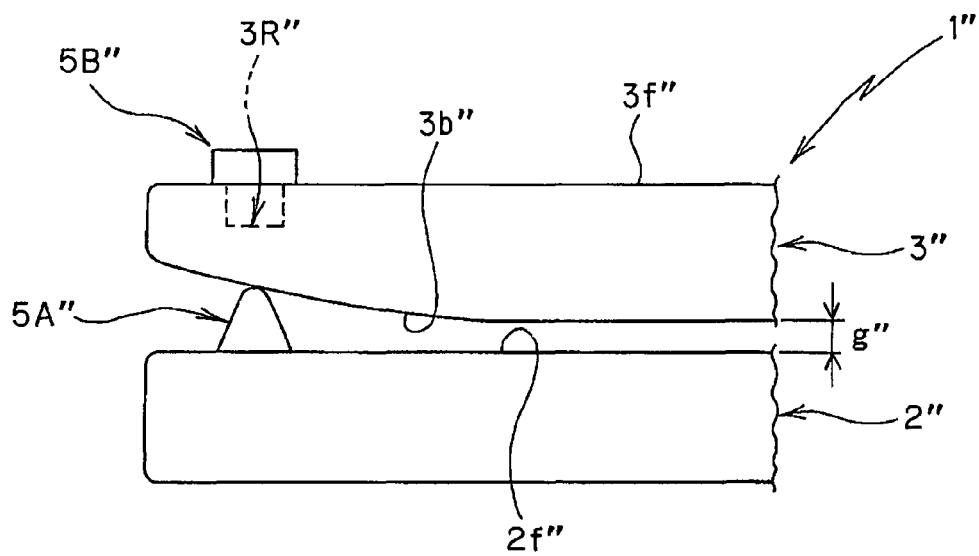
FIG. 15A is an enlarged partial side view of the mobile phone of the third embodiment in the flipped-closed mode to show operation of the clearance pads of the third embodiment.
Figure 15B:
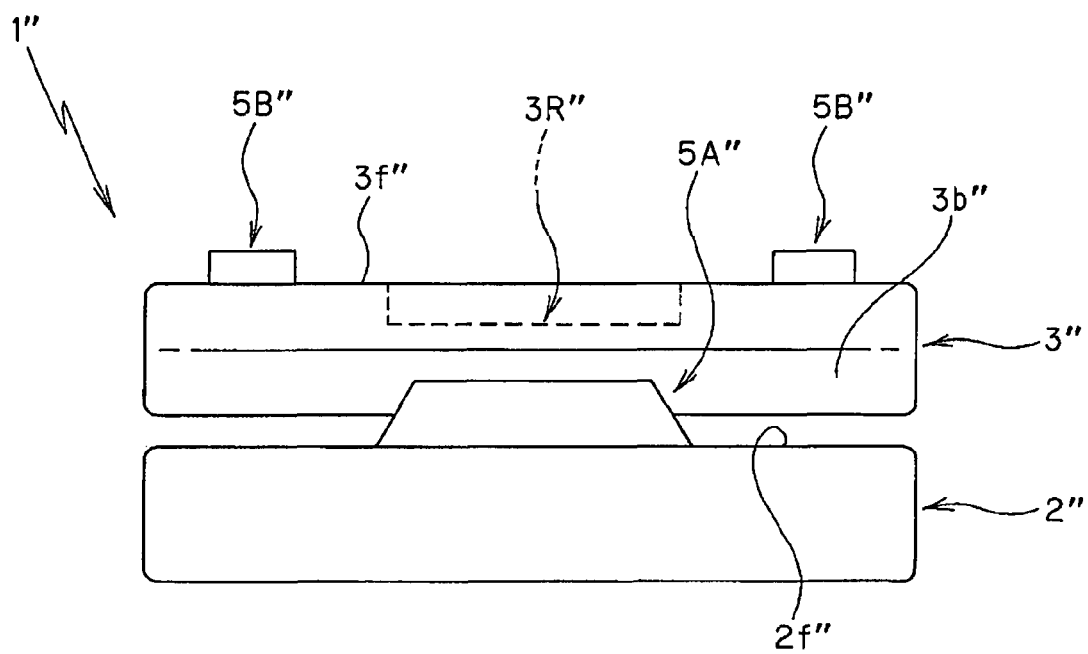
FIG. 15B is an enlarged end view of the mobile phone of the third embodiment in the flipped-closed mode to show operation of the clearance pads of the third embodiment.
Figure 16C:
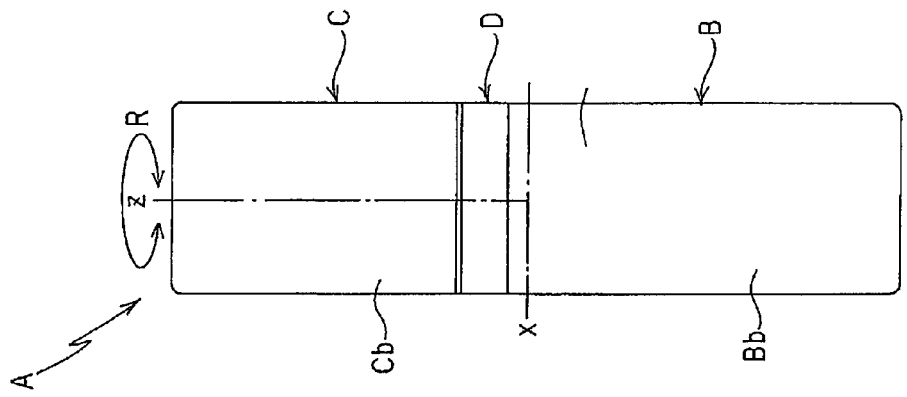
FIGS. 16A, 16B and 16C are a front view, a side view and a rear view, respectively, of a mobile phone of the prior art.
Figure 16B:
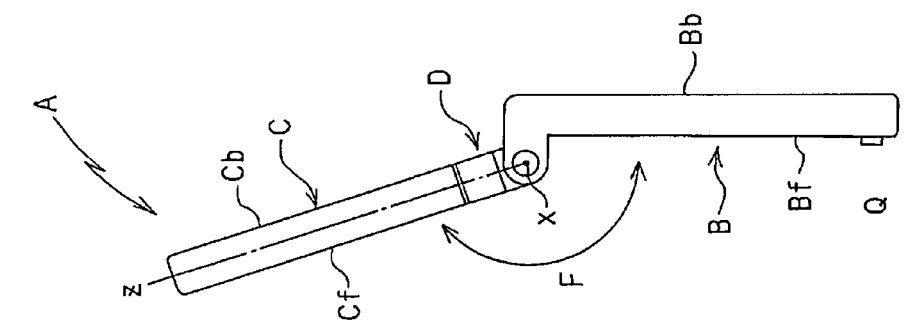
Figure 16A:
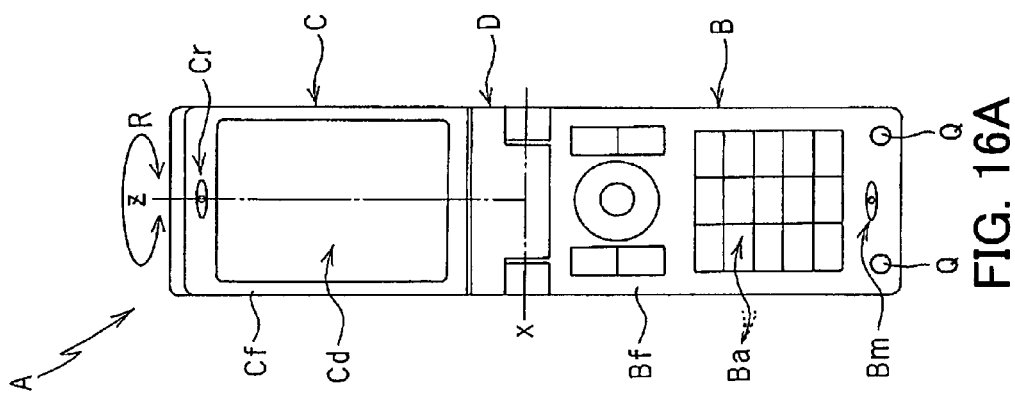
Figure 17A:
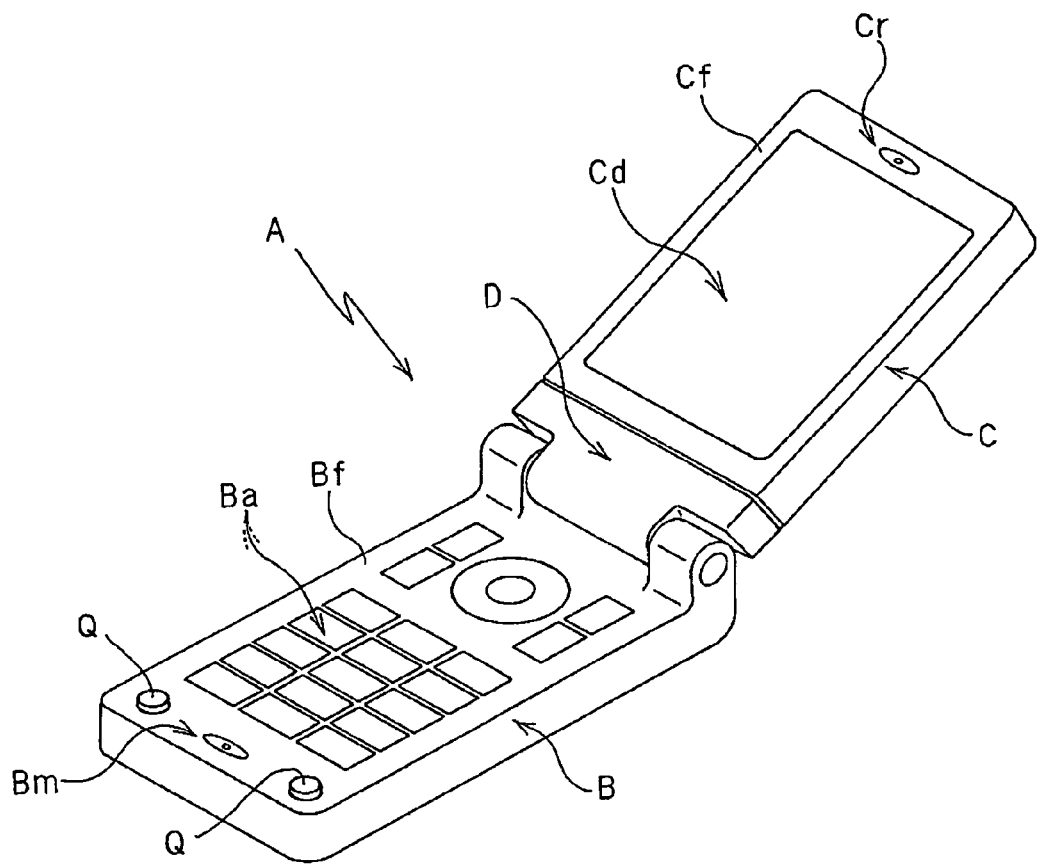
FIGS. 17A and 17B are perspective views of the mobile phone of the prior art in the open mode and in the closed mode, respectively.
Figure 17B:
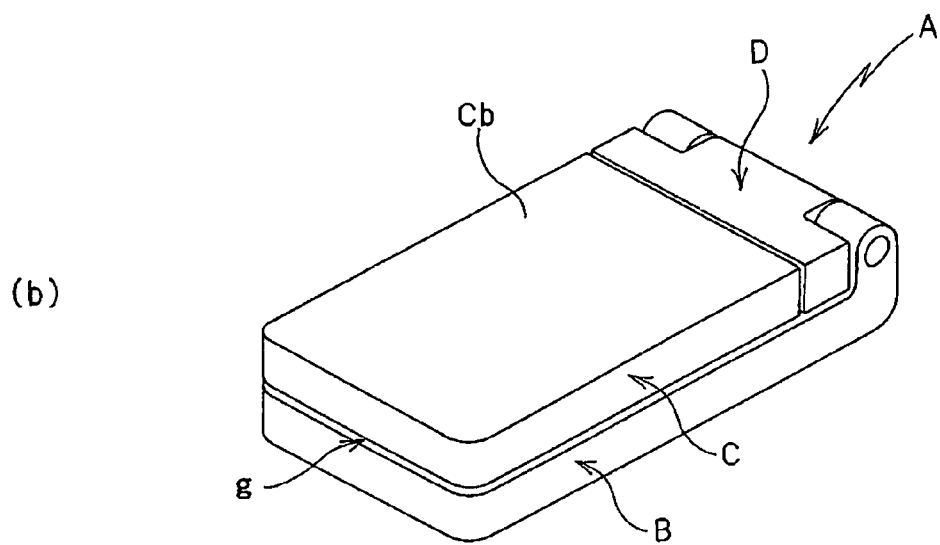
Figure 18A:
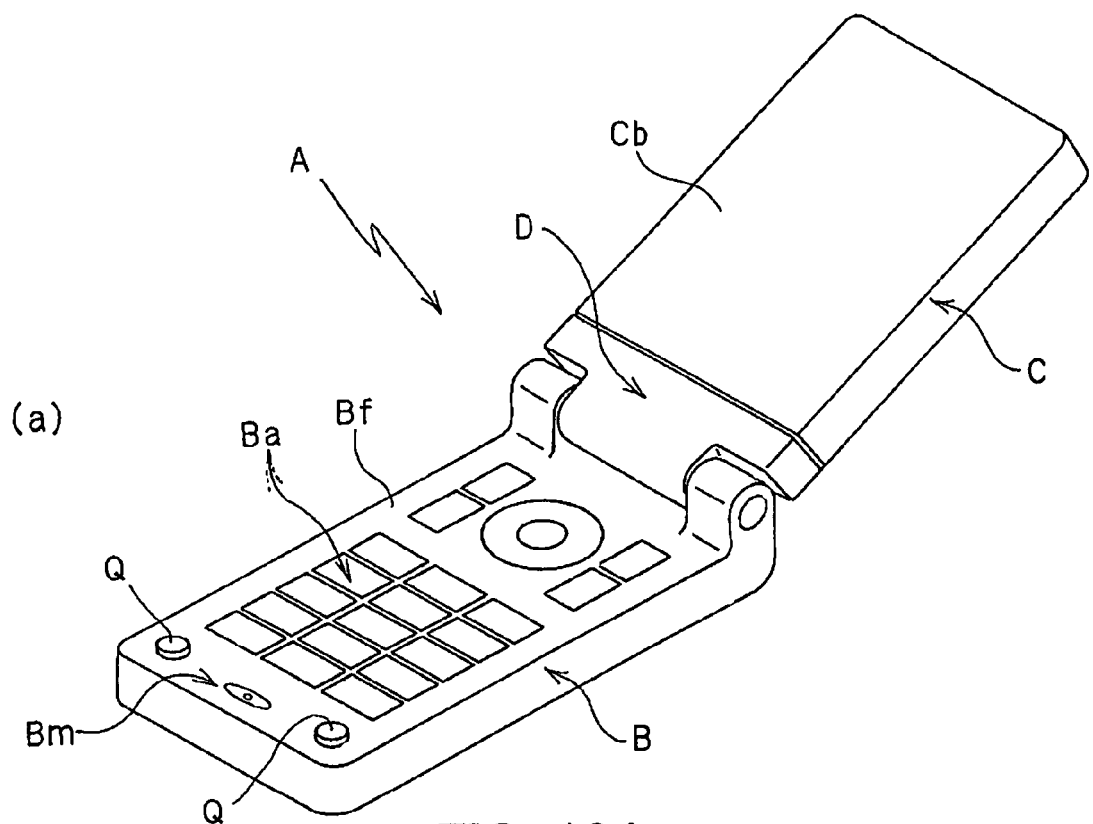
FIGS. 18A and 18B are perspective views of the mobile phone of the prior art in the flipped-open mode and in the flipped-closed mode.
Figure 18B:
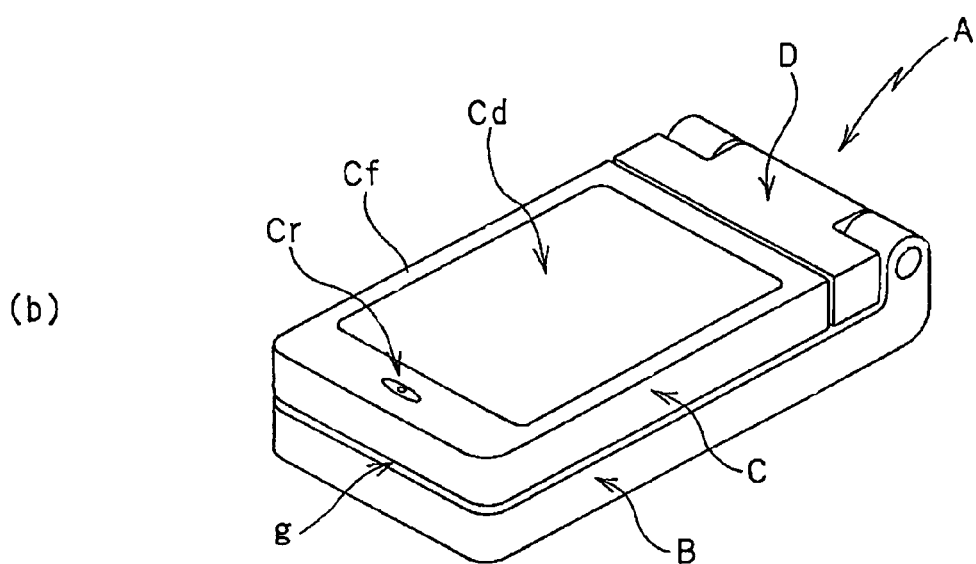

If the mobile phone 1" is in the flipped-closed mode shown in FIGS. 15A and 15B, the center clearance pad 5A" is in contact with the open end portion (see FIG. 15A) of the back face 3*b*" of the upper section 3". As shown in FIG. 15A, the clearance g" is thereby formed between the front face 2*f*" of the lower section 2" and the back face 3b" of the upper section 3", by supporting the back face 3b" of the upper section 3" by the center clearance pad 5A".

Thus, in the flipped-closed mode, as shown in FIGS. 15A and 15B, the center clearance pad 5A", which is taller than the side clearance pads 5B", 5B", is in contact with the open end portion of the curved back face 3b" of the upper section 3". Thereby, the clearance g" is formed between the lower section 2" and the upper section 3" and a relative position of the lower section 2" and the upper section 3" is kept constant, both in the closed mode and in the flipped-closed mode. (In the flipped-closed mode, the clearance between the lower section 2" and the upper section 3" widens outward from the clearance g" at the tip end of the upper section 3", due to the curving of the back face 3b".)

According to the third embodiment of the present invention described above, as according to the first and second embodiments, the front face 3f" and the back face 3b" of the upper section 3" of the mobile phone 1" may be shaped differently so that the degree of freedom of exterior design of the mobile phone 1" may be highly improved.

Each of the above embodiments has been described as an application of the present invention to a mobile phone, as an example of an electronic apparatus to which the structure of the present invention is applicable. The present invention may also be applied to other kinds of electronic apparatuses, such as, for example, an electronic dictionary or a personal digital assistant (PDA), having a first section and a second section which are foldably and rotationally connected through a connection including a rotating two-axis hinge.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. An electronic apparatus comprising:
   a first section;
   a second section;
   a connection section which couples the first section and the second section such that the first and second sections are foldably connected around a folding axis and are rotationally connected around a flipping axis which is perpendicular to the folding axis, such that the first section and the second section are foldable together in: (i) a first mode in which a front face of the first section faces a front face of the second section, and (ii) a second mode in which the front face of the first section faces a back face of the second section;
   a contact protector which is provided on the front face of the first section, and which comprises a rod-like member having two end portions, a first portion of the contact protector comprises the two end portions of the rod-like member and a second portion of the contact protector comprises a middle portion of the rod-like member between the two end portions, the first portion having a height that is less than a height of the second portion;
   a dent provided in the front face of the second section; and
   a curved surface provided in the back face of the second section opposite the dent, the curved surface gradually curving toward the front face;
   wherein when the first section and the second section are folded together in the first mode, the first portion of the contact protector is in contact with the front face of the second section and forms a first clearance between the front face of the first section and the front face of the second section, and the second portion of the contact protector is accommodated in the dent in the front face of the second section so as not to interfere with formation of the clearance;
   wherein when the first section and the second section are folded together in the second mode, the second portion of the contact protector is in contact with the curved surface of the back face of the second section and forms a second clearance between the front face of the first section and the back face of the second section; and
   wherein the first section and the second section are substantially parallel in both the first mode and the second mode.

2. The electronic apparatus of claim 1, wherein the dent comprises at least a part of a sound aperture of a speaker of the electronic apparatus.

3. The electronic apparatus of claim 1, wherein the second portion of the contact protector projects farther from the front face of the first section than the first portion.

4. The electronic apparatus of claim 1, wherein the rod-like member is a unitary member including both the first portion and the second portion.

\* \* \* \* \*